(12) United States Patent
Nakashima et al.

(10) Patent No.: US 10,220,458 B2
(45) Date of Patent: Mar. 5, 2019

(54) MACHINING POWER SUPPLY DEVICE FOR ELECTRIC DISCHARGE MACHINE

(71) Applicant: FANUC Corporation, Yamanashi (JP)

(72) Inventors: Yasuo Nakashima, Yamanashi (JP); Akiyoshi Kawahara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 74 days.

(21) Appl. No.: 14/694,501

(22) Filed: Apr. 23, 2015

(65) Prior Publication Data

US 2015/0314383 A1 Nov. 5, 2015

(30) Foreign Application Priority Data

Apr. 30, 2014 (JP) ................................ 2014-094293

(51) Int. Cl.
*B23H 1/02* (2006.01)
*B23H 7/14* (2006.01)

(52) U.S. Cl.
CPC .............. *B23H 1/022* (2013.01); *B23H 1/02* (2013.01); *B23H 7/14* (2013.01); *B23H 2300/20* (2013.01); *B23H 2300/22* (2013.01)

(58) Field of Classification Search
CPC .......... B23H 1/02; B23H 1/024; B23H 1/022; B23H 1/14; B23H 2300/20; B23H 2300/22
USPC ............................................. 219/69.13, 69.18
See application file for complete search history.

(56) References Cited

U.S. PATENT DOCUMENTS

| 4,347,425 | A | 8/1982 | Obara | |
| 6,580,048 | B2 * | 6/2003 | Hashimoto | B23H 1/022 219/69.13 |
| 2005/0194947 | A1 | 9/2005 | Murai et al. | |
| 2007/0023399 | A1 | 2/2007 | Buhler et al. | |
| 2008/0203068 | A1 * | 8/2008 | Ukai | B23H 1/024 219/69.13 |
| 2009/0314747 | A1 * | 12/2009 | Hashimoto | B23H 1/022 219/69.13 |

(Continued)

FOREIGN PATENT DOCUMENTS

| CN | 1663723 A | 9/2005 |
| JP | 58-196923 A | 11/1983 |

(Continued)

OTHER PUBLICATIONS

Decision to Grant a Patent dated Jan. 19, 2016, in Japanese Patent Application No. 2014-094293.

(Continued)

*Primary Examiner* — Dana Ross
*Assistant Examiner* — Joe E Mills, Jr.
(74) *Attorney, Agent, or Firm* — Hauptman Ham, LLP

(57) ABSTRACT

A machining power supply device for an electric discharge machine performs control to turn on a first semiconductor switching element, which is arranged in series between a DC power supply and a capacitor connected in parallel with a machining gap between an electrode and a workpiece, to charge the capacitor, and turn on a second semiconductor switching element, which is arranged in parallel with the capacitor and connected to a rectifier element, within a period in which the first semiconductor switching element is off.

6 Claims, 4 Drawing Sheets

(56) References Cited

U.S. PATENT DOCUMENTS

| 2010/0147805 A1* | 6/2010 | Ukai | B23H 1/024 |
| | | | 219/69.13 |
| 2010/0224596 A1* | 9/2010 | Hashimoto | B23H 7/04 |
| | | | 219/69.13 |
| 2015/0283634 A1* | 10/2015 | Kim | B23H 1/024 |
| | | | 219/69.18 |

FOREIGN PATENT DOCUMENTS

| JP | 63-2611 A | 1/1988 |
| JP | 1-146618 A | 6/1989 |
| JP | 6-143034 A | 5/1994 |
| JP | 2003-205426 A | 7/2003 |
| JP | 2007-038400 A | 2/2007 |

OTHER PUBLICATIONS

Extended European Search Report dated Sep. 10, 2015, corresponding to European Patent Application No. 15161566.3.
Office Action dated Sep. 15, 2015, corresponding to Japanese Patent Application No. 2014-094293.
Office Action in CN Application No. 201510212619.3, dated Mar. 17, 2017.
Office Action in EP Application No. 15161566.3, dated Apr. 9, 2018, 7pp.

* cited by examiner

MACHINING POWER SUPPLY DEVICE FOR ELECTRIC DISCHARGE MACHINE

RELATED APPLICATIONS

The present application claims priority to Japanese Application No. 2014-094293, filed Apr. 30, 2014, the disclosure of which is hereby incorporated by reference herein in its entirety.

BACKGROUND OF THE INVENTION

Field of the Invention

The present invention relates to a machining power supply device for an electric discharge machine which machines a workpiece into a desired shape by changing the relative positions of the workpiece and an electrode by a servomotor while applying a voltage to the machining gap between the electrode and the workpiece to cause an electric discharge across the gap.

Description of the Related Art

In electric discharge machining, rough machining and finish machining are used for different purposes. In the rough machining, the energy of a single discharge is increased to do high-speed processing. In the finish machining, the energy of a single discharge is decreased to do high-precision processing. For the finish machining, a "capacitor pulsed power supply" is widely used in which the charged energy in the capacitor is utilized for machining.

Techniques related to a machining power supply device for an electric discharge machine equipped with a capacitor pulsed power supply are disclosed in Japanese Patent Applications Laid-Open Nos. 2007-038400 and 2003-205426. Japanese Patent Application Laid-Open No. 2007-038400 above discloses a method for electric discharge machining wherein a capacitor after being discharged is recharged with a voltage having the same polarity as that of the residual voltage therein, to implement a higher discharge frequency. In this method, the capacitor charging direction is not reversed.

Japanese Patent Application Laid-Open No. 2003-205426 above discloses an electric discharge machining power supply which has a switch (field-effect transistor; FET) for short-circuiting the machining gap, to prevent a large discharge from being caused by an increased amount of charge accumulated in the gap, thereby ensuring that small discharges occur stably. In this electric discharge machining power supply, although the charge is drawn from the machining-gap capacitance, the charged voltage across the charging/discharging capacitor is not drawn. The charging direction is not reversed either.

In a capacitor pulsed power supply, less variation in the charged voltage across the capacitor leads to a more constant workpiece removal amount for each pulse, ensuring more uniform surface roughness. It also leads to less variation in the gap distance of the machining gap where an electric discharge occurs, ensuring more stable machining. Further, in the case of performing electrode feed control based on an average machining-gap voltage, or, so-called voltage servo feed, the above-described variation in voltage will cause disturbance of the average machining-gap voltage, and therefore, less variation in the charged voltage is desirable. With a conventional capacitor pulsed power supply, however, the charged voltage varies widely. An attempt to suppress the variation leads to a reduced machining speed.

FIG. 5 shows an example of a machining power supply device for an electric discharge machine equipped with a capacitor pulsed power supply.

The machining power supply device 10 includes a DC voltage source V (voltage E), semiconductor switching elements S1 and S3, a capacitor C, a machining-gap voltage detecting unit 5 which detects a voltage across a machining gap between an electrode 2 and a workpiece 3, and a control unit 4 which turns on/off the semiconductor switching elements S1 and S3.

FIG. 6 illustrates an operation of the machining power supply device for the electric discharge machine equipped with the capacitor pulsed power supply shown in FIG. 5. First, at the beginning of a cycle, the semiconductor switching element S1 is turned on for a period T1 to connect the DC voltage source V to the capacitor C for charging the capacitor C. The period T1, which is set in advance, is a time sufficient for the capacitor C to be charged.

Next, the semiconductor switching element S1 is turned off and, at the same time, the semiconductor switching element S3 is turned on to connect the charged capacitor C in parallel with the machining gap between the electrode and the workpiece. When the gap between the electrode and the workpiece is sufficiently small, an electric discharge occurs at a certain time point, and the charge accumulated in the capacitor C is discharged to the machining gap, whereby removal processing of the workpiece 3 is carried out.

Here, the machining-gap voltage detecting unit 5 checks for the occurrence of electric discharge, and upon detection of an electric discharge, the semiconductor switching element S3 is kept on for a period T2 from the time point when the discharge was detected. It may be configured such that a machining-gap current Ig is detected by a detecting unit (not shown). Here, the machining-gap voltage is denoted by Vg. The period T2 is a time sufficient for the capacitor C to be fully discharged. At this time, the capacitor C is charged in the direction opposite to the direction in which it was originally charged. This voltage (residual voltage) in the opposite direction varies depending on the state of the machining gap. Thereafter, a quiescent period is provided for a period T3 for recovery of insulation between the electrode and the workpiece. The above completes one cycle.

In the case where the semiconductor switching element S1 is turned on again in the next cycle to charge the capacitor C, the charged voltage jumps to exceed the power supply voltage E, as shown in FIG. 6. The amount of the jump depends on the residual voltage in the opposite direction. That is, the voltage jumps higher with a greater residual voltage (absolute value thereof). The above-described mechanism causes the charged voltage across the capacitor C to vary.

One of the most reliable ways of suppressing the variation in the charged voltage across the capacitor C will be to insert a current limiting resistor R in the charging circuit for the capacitor C (see FIG. 7). Even if the capacitor C is charged in the direction opposite to the direction in which it was originally charged, when the capacitor C is charged in a next cycle, the current limiting resistor R plays a damping role, so the variation in the charged voltage across the capacitor C can be prevented.

This approach, however, increases the time taken for charging the capacitor C, leading to reduction of the machining speed.

SUMMARY OF THE INVENTION

In view of the above-described problems of the conventional techniques, an object of the present invention is to provide a machining power supply device for an electric discharge machine capable of preventing variation in the charged voltage across a capacitor, without causing reduction of the machining speed.

A machining power supply device for an electric discharge machine according to the present invention is for an electric discharge machine configured to machine a workpiece by applying a voltage to a machining gap between an electrode and the workpiece to cause an electric discharge across the gap. The machining power supply device includes: a DC power supply; a capacitor directly or indirectly connected in parallel with the machining gap; a first semiconductor switching element arranged in series between the DC power supply and the capacitor; a second semiconductor switching element arranged in parallel with the capacitor; a rectifier element inserted in a circuit loop composed of the capacitor and the second semiconductor switching element; and a control unit configured to control the first and the second semiconductor switching elements, wherein the control unit is configured to turn on the first semiconductor switching element to charge the capacitor, and turn on the second semiconductor switching element within a period in which the first semiconductor switching element is off.

Another machining power supply device for an electric discharge machine according to the present invention is for an electric discharge machine configured to machine a workpiece by applying a voltage to a machining gap between an electrode and the workpiece to cause an electric discharge across the gap. The machining power supply device includes: a DC power supply; a capacitor directly or indirectly connected in parallel with the machining gap; a first semiconductor switching element arranged in series between the DC power supply and the capacitor; a second semiconductor switching element arranged in parallel with the capacitor; a detecting unit configured to detect a voltage or a current of the capacitor; and a control unit configured to control the first and the second semiconductor switching elements, wherein the control unit is configured to turn on the first semiconductor switching element to charge the capacitor, turn on the second semiconductor switching element within a period in which the first semiconductor switching element is off, and turn off the second semiconductor switching element in accordance with a detected value of the voltage or the current of the capacitor.

The above machining power supply devices may each include a third semiconductor switching element arranged in series between the machining gap and the capacitor, and the control unit may further perform control to turn on the third semiconductor switching element when turning off the first semiconductor switching element, and turn on the second semiconductor switching element within a period in which the first semiconductor switching element and the third semiconductor switching element are both off.

With the above-described configurations, the present invention can provide the machining power supply devices for an electric discharge machine capable of preventing variation in the charged voltage across the capacitor, without causing reduction of the machining speed.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
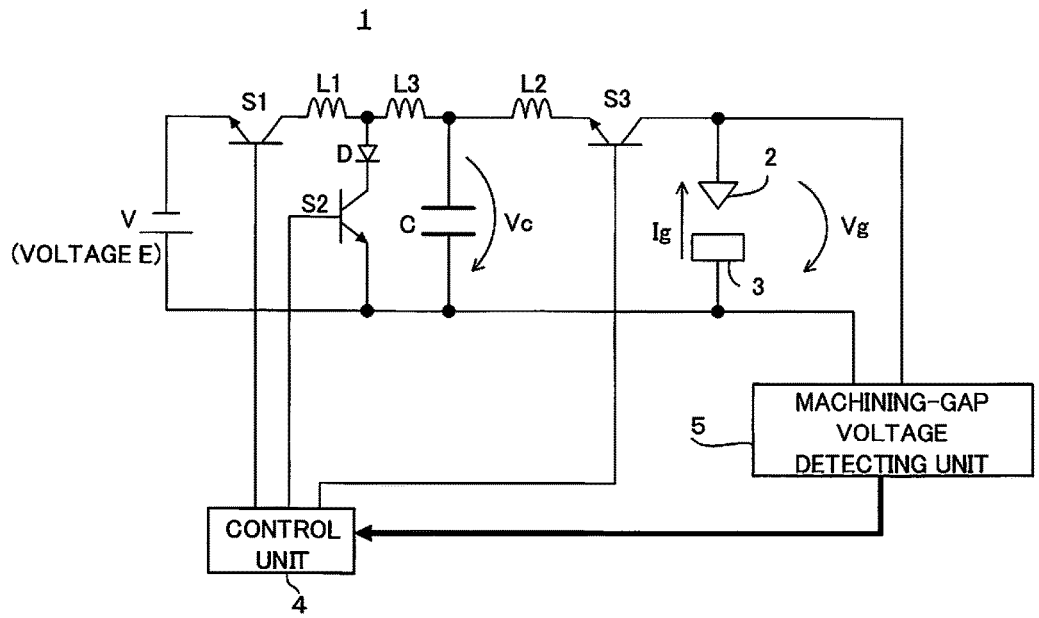
FIG. 1 shows an embodiment of a machining power supply device for an electric discharge machine according to the present invention.

Hereinafter, the same or similar components and structures as those in the conventional techniques are denoted by the same reference characters.

FIG. 1 shows an embodiment of a machining power supply device for an electric discharge machine according to the present invention. Examples of the electric discharge machine include a wire electric discharge machine and a die sinking electric discharge machine. The machining power supply device 1 is a power supply device for an electric discharge machine which performs electric discharge machining of a workpiece 3 by applying a voltage to a machining gap between an electrode 2 and the workpiece 3. The machining power supply device 1 for the electric discharge machine includes a DC voltage source V (voltage E), a first semiconductor switching element S1, a second semiconductor switching element S2, a third semiconductor switching element S3, a capacitor C, a rectifier element D, a machining-gap voltage detecting unit 5, and a control unit 4 which turns on/off the first and third semiconductor switching elements S1 and S3. In the figure, reference characters L1, L2, and L3 denote stray inductances. The capacitor C is charged by the DC voltage source V. The electric power charged in the capacitor C is applied in pulses to the machining gap between the electrode 2 and the workpiece 3. The machining-gap voltage detecting unit 5 detects the voltage across the machining gap. Although not shown in the figure, a machining-gap current Ig flowing across the machining gap may be detected by a detecting unit.

Figure 2:
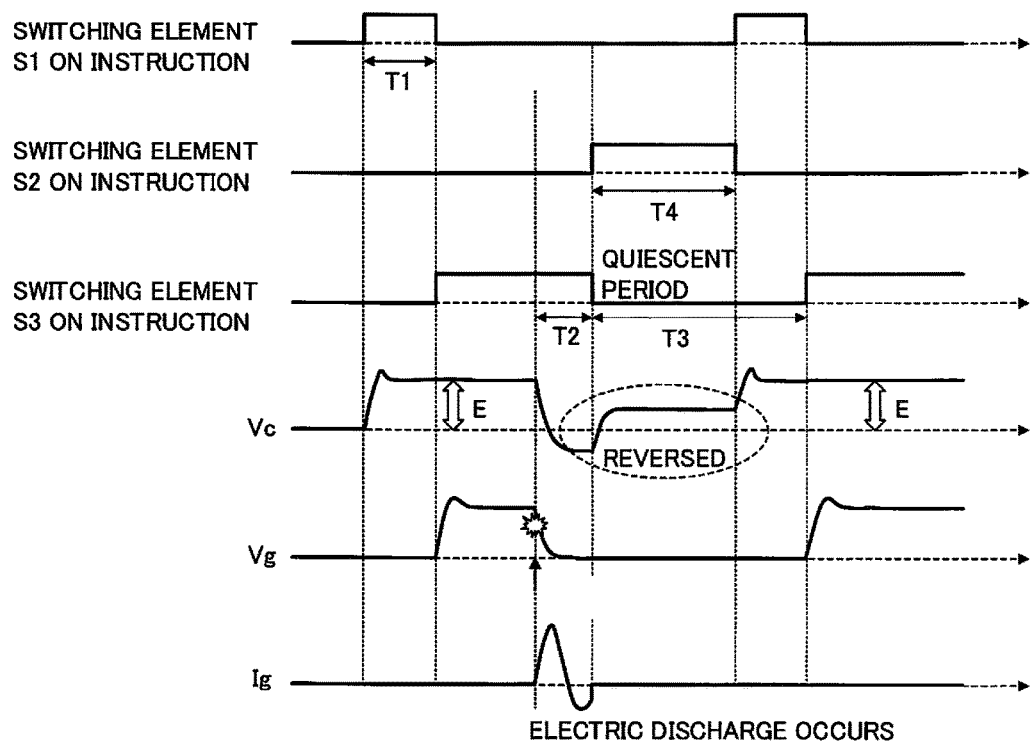
FIG. 2 illustrates an operation of the machining power supply device for the electric discharge machine in the case of using the capacitor pulsed power supply in FIG. 1.

FIG. 2 illustrates an operation of the machining power supply device 1 for the electric discharge machine in the case of using the capacitor pulsed power supply in FIG. 1. First, at the beginning of a cycle, the first semiconductor switching element S1 is turned on for a period T1 to connect the DC voltage source V to the capacitor C for charging the capacitor C. The period T1, which is set in advance, is a time sufficient for the capacitor C to be charged. The first semiconductor switching element S1 is turned off and, at the same time, the third semiconductor switching element S3 is turned on to connect the charged capacitor C in parallel with the machining gap between the electrode 2 and the workpiece 3. When the gap between the electrode and the workpiece is sufficiently small, an electric discharge occurs at a certain time point, and the charge accumulated in the capacitor C is discharged to the machining gap, whereby the removal machining of the workpiece 3 is carried out.

Here, the machining-gap voltage detecting unit 5 checks for the occurrence of electric discharge, and upon detection of an electric discharge, the third semiconductor switching element S3 is kept on for a period T2 from the time point when the discharge was detected. The period T2 is a time sufficient for the capacitor C to be fully discharged. At this time, the capacitor C is charged in the direction opposite to the direction in which it was originally charged. Thereafter, a quiescent period is provided for a period T3. During the period T3, the second semiconductor switching element S2 is turned on within a period (period T4 in FIG. 2) in which the first semiconductor switching element S1 is off, to reverse the residual voltage in the opposite direction.

Here, the rectifier element D is inserted in the direction in which it can reverse the residual voltage charged in the opposite direction. The rectifier element D serves to prevent the voltage that has been once reversed from being reversed again. The above completes one cycle. When the first semiconductor switching element Si is turned on again in the next cycle to charge the capacitor C, the charged voltage will not jump; rather, it will become approximately equal to the power supply voltage E.

Another embodiment will be described with reference to FIG. 3.

Figure 4:
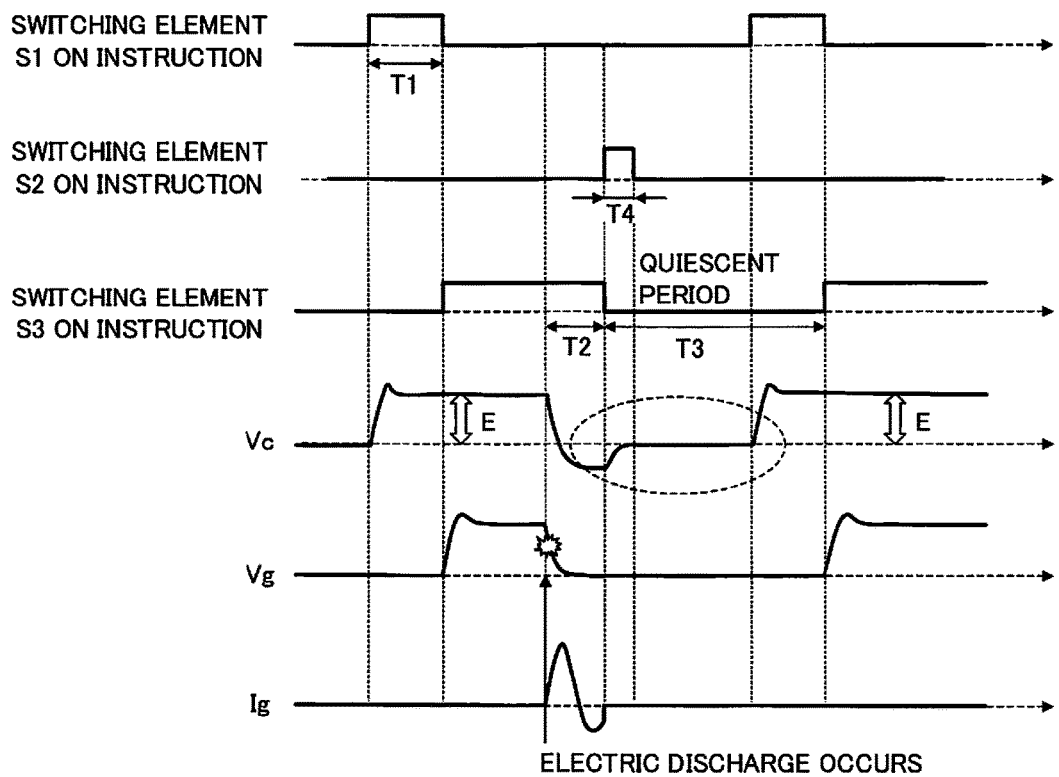
FIG. 4 illustrates an operation of the machining power supply device for the electric discharge machine in the case of using the capacitor pulsed power supply in FIG. 3.
Figure 5:
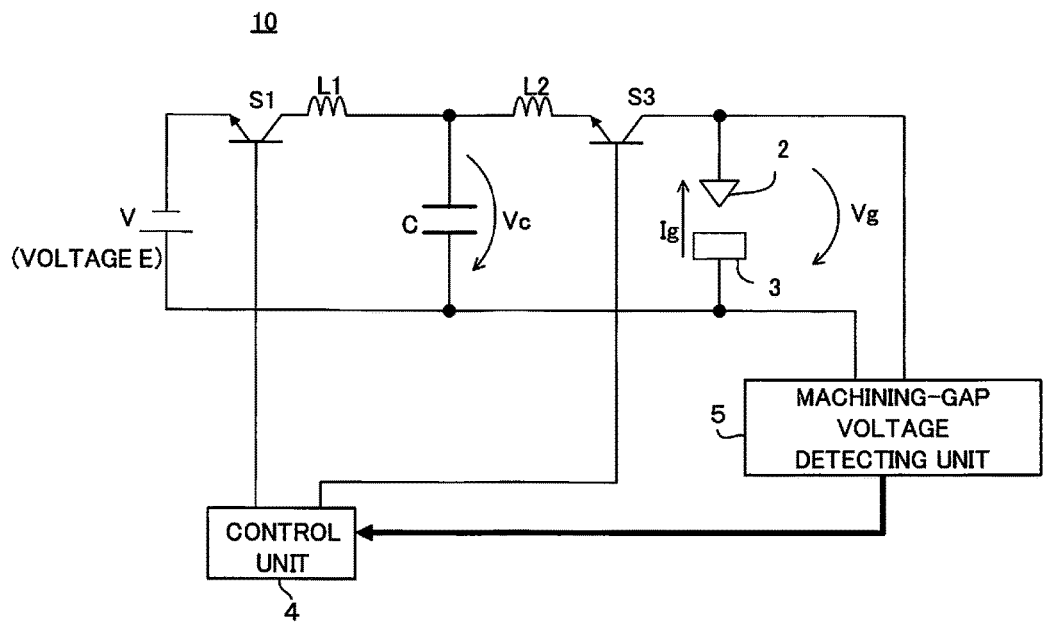
FIG. 5 shows an example of a machining power supply device for an electric discharge machine including a conventional capacitor pulsed power supply.
Figure 6:
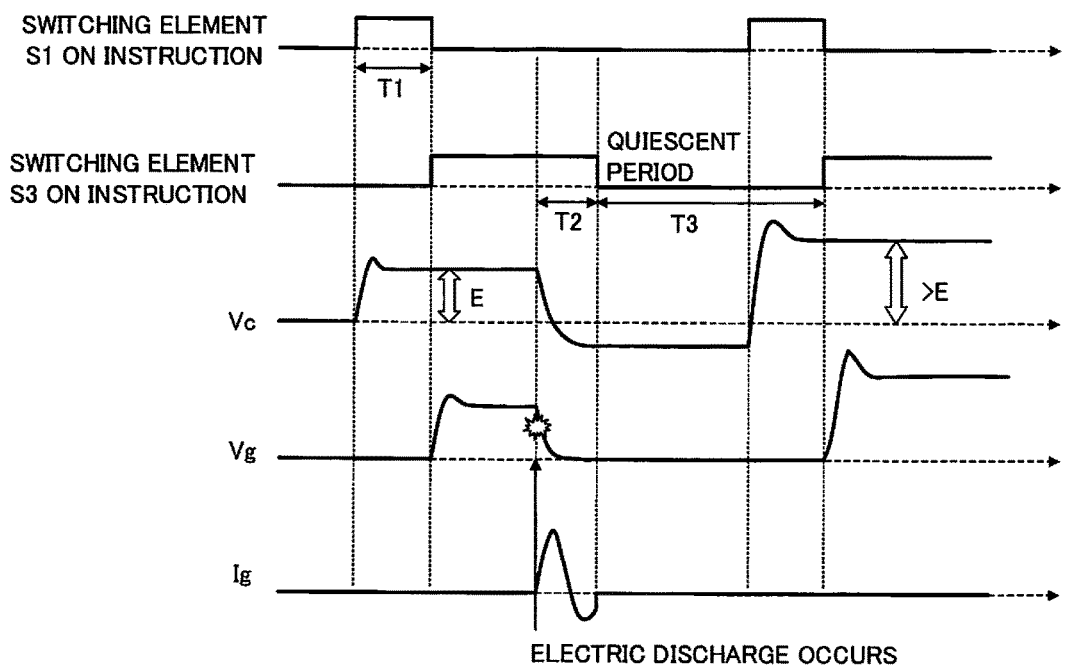
FIG. 6 illustrates an operation of the machining power supply device for the electric discharge machine in the case of using the capacitor pulsed power supply in FIG. 5.
Figure 7:
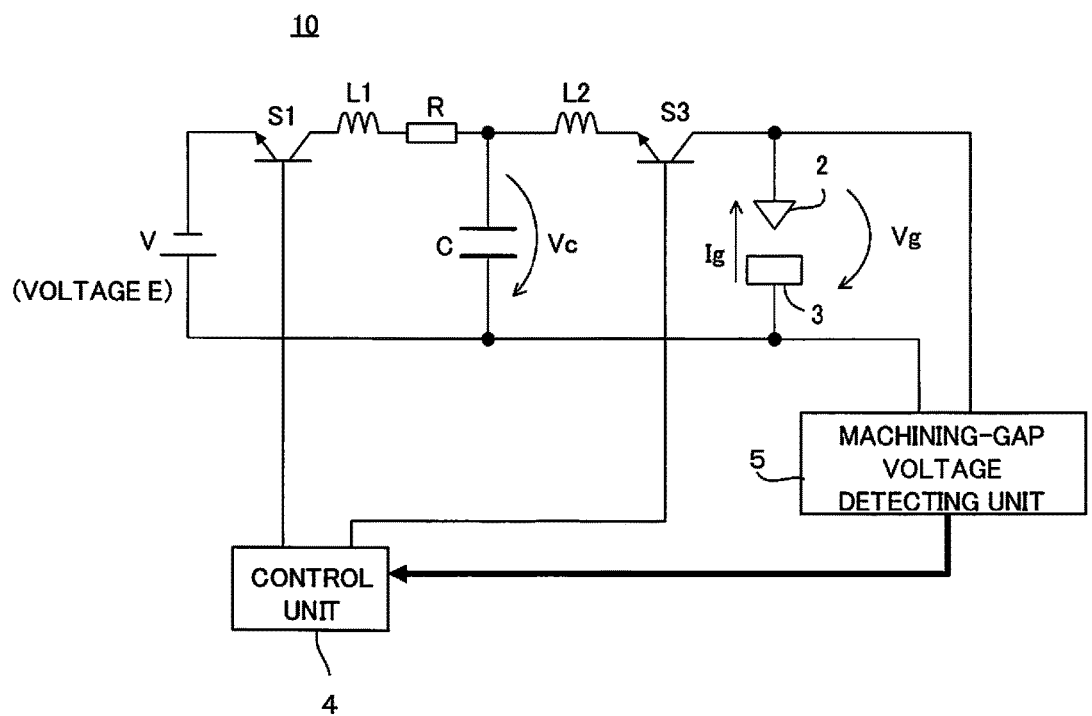
FIG. 7 shows another example of the capacitor pulsed power supply.

This embodiment differs from the embodiment shown in FIG. 1 in that the rectifier element D is replaced with a capacitor voltage detecting unit 6 which detects the voltage of the capacitor C. With the voltage of the capacitor C (capacitor voltage Vc) being monitored by the capacitor voltage detecting unit 6, when the voltage attains a desired value (which is zero in the example in FIG. 4), the control unit 4 turns off the second semiconductor switching element S2, to thereby control the residual voltage of the capacitor C. It should be noted that the current flowing through the capacitor C is detected by a detecting unit (not shown). The control unit 4 may turn off the second semiconductor switching element S2 on the basis of the detected current value, to control the residual voltage of the capacitor C.

Figure 3:
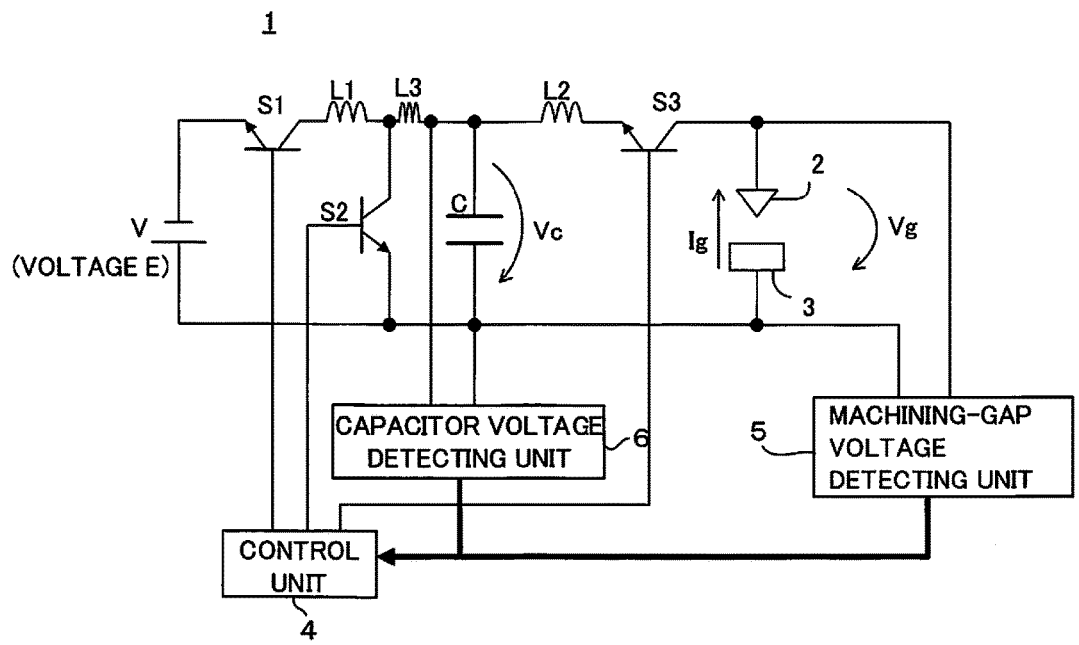
FIG. 3 shows another embodiment of the present invention.

While the residual voltage is reversed in the embodiment shown in FIG. 1, in the embodiment shown in FIG. 3, the charged voltage can be controlled to take a desired value (which is zero, or may be a reduced value if not reversed). In this embodiment as well, it is possible to suppress the variation in the charged voltage across the capacitor.

The invention claimed is:

1. A machining power supply device for an electric discharge machine configured to machine a workpiece by applying a voltage to a machining gap between an electrode and the workpiece to cause an electric discharge across the gap, the machining power supply device comprising:
a DC power supply;
a capacitor directly or indirectly connected in parallel with the machining gap;
a first semiconductor switching element arranged in a first circuit loop including the DC power supply and the capacitor;
a second semiconductor switching element arranged in parallel with the capacitor;
a rectifier element inserted in a second circuit loop including the capacitor and the second semiconductor switching element;
a third semiconductor switching element arranged in a third circuit loop including the machining gap and the capacitor; and
a controller programed to control the first, second and third semiconductor switching elements, wherein
the controller is programmed to
during a first time period, turn on the first semiconductor switching element to fully charge the capacitor in a first direction,
during a second time period after the first time period, turn off the first semiconductor switching element and turn on the third semiconductor switching element to discharge the fully charged capacitor and to charge the capacitor to a residual voltage in a second direction opposite to the first direction, and
during a third time period after the second time period, turn off the third semiconductor switching element and turn on the second semiconductor switching element while the first semiconductor switching element is off to reverse the residual voltage of the capacitor.

2. A machining power supply device for an electric discharge machine configured to machine a workpiece by applying a voltage to a machining gap between an electrode and the workpiece to cause an electric discharge across the gap, the machining power supply device comprising:
a DC power supply;
a capacitor directly or indirectly connected in parallel with the machining gap;
a first semiconductor switching element arranged in a first circuit loop including the DC power supply and the capacitor;
a second semiconductor switching element arranged in parallel with the capacitor;
a voltage or current detector configured to detect a voltage or a current of the capacitor;
a third semiconductor switching element arranged in a second circuit loop including the machining gap and the capacitor; and
a controller programed to control the first, second and third semiconductor switching elements, wherein
the controller is programmed to
during a first time period, turn on the first semiconductor switching element to fully charge the capacitor in a first direction,
during a second time period after the first time period, turn off the first semiconductor switching element and turn on the third semiconductor switching element to discharge the fully charged capacitor and to charge the capacitor to a residual voltage in a second direction opposite to the first direction,
during a third time period after the second time period, turn off the third semiconductor switching element and turn on the second semiconductor switching element while the first semiconductor switching element is off to charge the capacitor in the first direction to reduce the residual voltage of the capacitor, and
turn off the second semiconductor switching element in accordance with a value of the voltage or the current of the capacitor detected by the voltage or current detector.

3. The machining power supply device according to claim 1, wherein the third semiconductor switching element is arranged in series between the machining gap and the capacitor.

4. The machining power supply according to claim 1, wherein
the controller is further programmed to keep the third semiconductor switching element turned on during the second time period, which includes a time point when the electric discharge is detected.

5. The machining power supply according to claim 1, wherein
the controller is further programmed to turn off the second semiconductor switching element at the end of the third time period while the third switching element is turned off.

6. The machining power supply according to claim 1, wherein the rectifier element is inserted in the second circuit loop in a direction in which the rectifier element reverses the residual voltage of the capacitor charged in the second direction.

* * * * *